US008914557B2

(12) United States Patent
Fortin et al.

(10) Patent No.: US 8,914,557 B2
(45) Date of Patent: Dec. 16, 2014

(54) OPTIMIZING WRITE AND WEAR PERFORMANCE FOR A MEMORY (75) Inventors: Michael R. Fortin, Redmond, WA (US); Robert L. Reinauer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 601 days.

(21) Appl. No.: 11/303,382

(22) Filed: Dec. 16, 2005

(65) Prior Publication Data
US 2007/0162700 A1 Jul. 12, 2007

(51) Int. Cl.
G06F 3/00 (2006.01)
G06F 12/00 (2006.01)
G06F 12/02 (2006.01)
G06F 12/08 (2006.01)
G06F 12/12 (2006.01)

(52) U.S. Cl.
CPC ........ *G06F 12/0808* (2013.01); *G06F 12/0246* (2013.01); *G06F 2212/7211* (2013.01); *G06F 12/12* (2013.01); *G06F 2212/1036* (2013.01)
USPC ............................................ 710/29; 711/141

(58) Field of Classification Search
CPC .................................................. G06F 12/0246
USPC ............................................ 710/29; 711/103
See application file for complete search history.

(56) References Cited

U.S. PATENT DOCUMENTS

| 4,476,526 A | 10/1984 | Dodd |
| 4,612,612 A | 9/1986 | Woffinden |
| 4,945,474 A | 7/1990 | Elliott et al. |
| 4,972,316 A | 11/1990 | Dixon et al. |
| 4,979,108 A | 12/1990 | Crabbe, Jr. |
| 5,088,026 A | 2/1992 | Bozman |
| 5,175,834 A | 12/1992 | Sawai |
| 5,263,136 A | 11/1993 | DeAguiar |
| 5,297,258 A | 3/1994 | Hale |

(Continued)

FOREIGN PATENT DOCUMENTS

| CN | 1266229 | 9/2000 |
| CS | 1465009 A | 12/2003 |

(Continued)

OTHER PUBLICATIONS

Larsen et al., "Improve Programming Performance with Intel® Flash Memory Enhanced Factory Programming," Intel Corporation 2006, http://www.intel.com/design/flash/articles/EFP.htm.

(Continued)

*Primary Examiner* — Titus Wong
(74) *Attorney, Agent, or Firm* — John Jardine; Kate Drakos; Micky Minhas (57) ABSTRACT In an example embodiment, data is transferred from a higher speed memory to a lower speed memory or data storage device after determining a size of a block of data to be written to the lower speed memory. In an example embodiment data is collected in the higher speed memory until an amount of collected data is equal to or greater than the size of the block to be written, and then the collected data is transferred to the lower speed memory or data storage. In an example embodiment, the block size can be a predefined erase block size of the lower speed memory. In an example embodiment, the lower speed device is a flash memory.

20 Claims, 2 Drawing Sheets

(56) References Cited

U.S. PATENT DOCUMENTS

| | | | |
|---|---|---|---|
| 5,307,497 A | 4/1994 | Feigenbaum | |
| 5,394,531 A | 2/1995 | Smith | |
| 5,398,325 A | 3/1995 | Chang | |
| 5,420,998 A | 5/1995 | Horning | |
| 5,454,098 A | 9/1995 | Pisello | |
| 5,463,739 A | 10/1995 | Albaugh et al. | |
| 5,524,230 A | 6/1996 | Sakaue | |
| 5,551,002 A | 8/1996 | Rosich | |
| 5,557,770 A | 9/1996 | Bhide | |
| 5,561,783 A | 10/1996 | Vanka | |
| 5,572,660 A * | 11/1996 | Jones | 714/6.12 |
| 5,574,877 A | 11/1996 | Dixit | |
| 5,586,290 A | 12/1996 | Hirai | |
| 5,603,001 A | 2/1997 | Sukegawa et al. | |
| 5,611,067 A | 3/1997 | Okamoto | |
| 5,652,857 A | 7/1997 | Shimoi et al. | |
| 5,666,532 A | 9/1997 | Saks | |
| 5,717,954 A | 2/1998 | Grieff | |
| 5,720,029 A | 2/1998 | Kern et al. | |
| 5,740,434 A | 4/1998 | Eastep | |
| 5,751,932 A | 5/1998 | Horst et al. | |
| 5,754,782 A | 5/1998 | Masada | |
| 5,754,888 A | 5/1998 | Yang | |
| 5,764,877 A | 6/1998 | Lomet et al. | |
| 5,806,074 A | 9/1998 | Souder et al. | |
| 5,809,280 A | 9/1998 | Chard | |
| 5,809,543 A | 9/1998 | Byers | |
| 5,832,515 A | 11/1998 | Ledain | |
| 5,845,293 A | 12/1998 | Veghte | |
| 5,860,083 A | 1/1999 | Sukegawa | |
| 5,875,466 A | 2/1999 | Wakerly | |
| 5,897,638 A | 4/1999 | Lasser et al. | |
| 5,897,660 A | 4/1999 | Reinders | |
| 5,900,022 A | 5/1999 | Kranich | |
| 5,900,870 A | 5/1999 | Malone et al. | |
| 5,923,838 A | 7/1999 | Hongo et al. | |
| 5,943,692 A | 8/1999 | Marberg et al. | |
| 5,996,054 A | 11/1999 | Ledain | |
| 6,000,006 A * | 12/1999 | Bruce et al. | 711/103 |
| 6,018,433 A | 1/2000 | Thayne et al. | |
| 6,018,746 A | 1/2000 | Hill et al. | |
| 6,026,027 A * | 2/2000 | Terrell et al. | 365/185.33 |
| 6,047,291 A | 4/2000 | Anderson et al. | |
| 6,073,232 A | 6/2000 | Kroeker | |
| 6,092,160 A * | 7/2000 | Marsters | 711/156 |
| 6,098,075 A | 8/2000 | Becraft, Jr. et al. | |
| 6,101,601 A | 8/2000 | Matthews | |
| 6,108,004 A | 8/2000 | Medl | |
| 6,112,024 A | 8/2000 | Almond et al. | |
| 6,122,685 A | 9/2000 | Bachmat | |
| 6,128,627 A | 10/2000 | Mattis | |
| 6,138,125 A | 10/2000 | DeMoss | |
| 6,148,368 A | 11/2000 | DeKoning | |
| 6,185,629 B1 | 2/2001 | Simpson | |
| 6,189,071 B1 | 2/2001 | Bachmat | |
| 6,199,195 B1 | 3/2001 | Goodwin et al. | |
| 6,209,088 B1 | 3/2001 | Reneris | |
| 6,230,233 B1 * | 5/2001 | Lofgren et al. | 711/103 |
| 6,237,065 B1 | 5/2001 | Banerjia | |
| 6,240,414 B1 | 5/2001 | Beizer et al. | |
| 6,247,026 B1 | 6/2001 | Waldo et al. | |
| 6,249,841 B1 * | 6/2001 | Sikes et al. | 711/107 |
| 6,272,534 B1 | 8/2001 | Guha | |
| 6,275,436 B1 | 8/2001 | Tobita et al. | |
| 6,298,428 B1 | 10/2001 | Munroe | |
| 6,301,635 B2 * | 10/2001 | Bothwell et al. | 711/103 |
| 6,311,232 B1 | 10/2001 | Cagle | |
| 6,314,433 B1 | 11/2001 | Mills et al. | |
| 6,317,806 B1 | 11/2001 | Audityan | |
| 6,321,234 B1 | 11/2001 | Debrunner | |
| 6,338,056 B1 | 1/2002 | Dessloch et al. | |
| 6,338,126 B1 | 1/2002 | Ohran et al. | |
| 6,345,000 B1 | 2/2002 | Wong | |
| 6,360,330 B1 | 3/2002 | Mutalik et al. | |
| 6,366,996 B1 | 4/2002 | Hobson | |
| 6,370,534 B1 | 4/2002 | Odom et al. | |
| 6,370,541 B1 | 4/2002 | Chou et al. | |
| 6,378,043 B1 | 4/2002 | Girkar | |
| 6,401,093 B1 | 6/2002 | Anand et al. | |
| 6,408,058 B1 | 6/2002 | Lanet | |
| 6,418,510 B1 | 7/2002 | Lamberts | |
| 6,425,057 B1 | 7/2002 | Cherkasova | |
| 6,434,682 B1 | 8/2002 | Ashton | |
| 6,438,750 B1 | 8/2002 | Anderson | |
| 6,454,159 B1 | 9/2002 | Takushima | |
| 6,477,564 B1 | 11/2002 | Freyssinet et al. | |
| 6,505,205 B1 | 1/2003 | Kothuri et al. | |
| 6,513,051 B1 | 1/2003 | Bolosky | |
| 6,516,380 B2 | 2/2003 | Kenchammana-Hoskote | |
| 6,519,597 B1 | 2/2003 | Cheng et al. | |
| 6,535,949 B1 | 3/2003 | Parker | |
| 6,539,456 B2 | 3/2003 | Stewart | |
| 6,542,904 B2 | 4/2003 | Crus et al. | |
| 6,546,472 B2 | 4/2003 | Atkinson | |
| 6,556,983 B1 | 4/2003 | Altschuler et al. | |
| 6,557,077 B1 | 4/2003 | Ghosh | |
| 6,560,702 B1 | 5/2003 | Gharda et al. | |
| 6,567,889 B1 | 5/2003 | Dekoning et al. | |
| 6,578,046 B2 | 6/2003 | Chang et al. | |
| 6,615,313 B2 | 9/2003 | Kato et al. | |
| 6,629,201 B2 | 9/2003 | Dempsey | |
| 6,636,942 B2 | 10/2003 | Greco | |
| 6,640,278 B1 | 10/2003 | Nolan et al. | |
| 6,647,472 B2 | 11/2003 | Atkinson | |
| 6,651,141 B2 | 11/2003 | Adrangi | |
| 6,671,699 B1 | 12/2003 | Black et al. | |
| 6,671,757 B1 | 12/2003 | Cash et al. | |
| 6,684,229 B1 | 1/2004 | Luong et al. | |
| 6,687,158 B2 | 2/2004 | Yano et al. | |
| 6,694,336 B1 | 2/2004 | Multer et al. | |
| 6,714,935 B1 | 3/2004 | Delo | |
| 6,718,361 B1 | 4/2004 | Basani et al. | |
| 6,721,863 B1 | 4/2004 | Endo | |
| 6,738,789 B2 | 5/2004 | Multer et al. | |
| 6,742,097 B2 | 5/2004 | Woo | |
| 6,751,658 B1 | 6/2004 | Haun et al. | |
| 6,757,696 B2 | 6/2004 | Multer et al. | |
| 6,760,736 B2 | 7/2004 | Waldo et al. | |
| 6,769,050 B1 | 7/2004 | Ware et al. | |
| 6,771,536 B2 | 8/2004 | Li et al. | |
| 6,772,178 B2 | 8/2004 | Mandal et al. | |
| 6,782,453 B2 | 8/2004 | Keltcher | |
| 6,788,612 B2 | 9/2004 | Hsu et al. | |
| 6,871,271 B2 | 3/2005 | Ohran et al. | |
| 6,877,081 B2 | 4/2005 | Herger | |
| 6,879,266 B1 | 4/2005 | Dye | |
| 6,901,499 B2 | 5/2005 | Aasheim et al. | |
| 6,910,106 B2 | 6/2005 | Sechrest | |
| 6,918,022 B2 | 7/2005 | Li | |
| 6,928,521 B1 | 8/2005 | Burton | |
| 6,930,919 B2 | 8/2005 | Lee et al. | |
| 6,938,116 B2 * | 8/2005 | Kim et al. | 711/103 |
| 6,941,423 B2 * | 9/2005 | Coulson | 711/141 |
| 6,959,318 B1 | 10/2005 | Tso | |
| 6,996,660 B1 | 2/2006 | Moore | |
| 7,007,072 B1 | 2/2006 | Guha | |
| 7,010,645 B2 | 3/2006 | Hetzler | |
| 7,017,037 B2 | 3/2006 | Fortin et al. | |
| 7,036,040 B2 | 4/2006 | Nicholson et al. | |
| 7,039,765 B1 | 5/2006 | Wilkes | |
| 7,043,610 B2 | 5/2006 | Horn | |
| 7,057,942 B2 * | 6/2006 | Suda et al. | 365/189.15 |
| 7,062,675 B1 | 6/2006 | Kemeny | |
| 7,065,627 B2 | 6/2006 | Dayan et al. | |
| 7,068,575 B2 * | 6/2006 | Gabryjelski | 369/47.33 |
| 7,082,495 B2 | 7/2006 | DeWhitt et al. | |
| 7,082,499 B2 | 7/2006 | Kamitani | |
| 7,143,120 B2 | 11/2006 | Oks et al. | |
| 7,171,532 B2 | 1/2007 | Kodama | |
| 7,185,155 B2 | 2/2007 | Sechrest | |
| 7,231,497 B2 | 6/2007 | Trika | |
| 7,284,149 B1 | 10/2007 | Fisher | |
| 7,366,740 B2 | 4/2008 | Sleeman et al. | |
| 7,366,866 B2 * | 4/2008 | Cochran et al. | 711/171 |

(56) References Cited

U.S. PATENT DOCUMENTS

| | | | |
|---|---|---|---|
| 7,380,090 B2 | 5/2008 | Koseki | |
| 7,395,401 B2* | 7/2008 | Sanders et al. | 711/170 |
| 7,409,537 B2 | 8/2008 | Tsang | |
| 7,412,369 B1* | 8/2008 | Gupta | 703/14 |
| 7,412,562 B2* | 8/2008 | Garney | 711/113 |
| 7,451,353 B2 | 11/2008 | Grimsrud | |
| 7,472,230 B2* | 12/2008 | Prabhu | 711/143 |
| 7,490,197 B2 | 2/2009 | Kirshenbaum | |
| 7,631,140 B2* | 12/2009 | Saito et al. | 711/111 |
| 7,644,239 B2 | 1/2010 | Ergan et al. | |
| 7,698,513 B2 | 4/2010 | Sechrest | |
| 7,774,508 B2* | 8/2010 | Nakamura et al. | 710/5 |
| 7,805,571 B2 | 9/2010 | Kirshenbaum | |
| 7,814,261 B2 | 10/2010 | Lee | |
| 7,818,701 B1 | 10/2010 | Kolokowsky | |
| 7,945,734 B2 | 5/2011 | Lahcanski | |
| 7,953,774 B2 | 5/2011 | Cong | |
| 8,006,037 B2 | 8/2011 | Kirshenbaum | |
| 8,032,707 B2 | 10/2011 | Iyigun | |
| 8,032,723 B2 | 10/2011 | Sechrest | |
| 8,108,450 B2 | 1/2012 | Cong | |
| 8,135,914 B2 | 3/2012 | Iyigun | |
| 8,255,645 B2 | 8/2012 | Ergan et al. | |
| 2001/0007123 A1 | 7/2001 | Seguchi | |
| 2001/0007999 A1 | 7/2001 | Rasmussen et al. | |
| 2001/0047462 A1 | 11/2001 | Dimitroff et al. | |
| 2002/0004876 A1 | 1/2002 | Timmer et al. | |
| 2002/0073276 A1 | 6/2002 | Howard | |
| 2002/0083275 A1 | 6/2002 | Kawamoto | |
| 2002/0087797 A1 | 7/2002 | Adrangi | |
| 2002/0087816 A1 | 7/2002 | Atkinson | |
| 2002/0091702 A1 | 7/2002 | Mullins | |
| 2002/0108017 A1 | 8/2002 | Kenchammana-Hoskote | |
| 2002/0143521 A1 | 10/2002 | Call | |
| 2002/0152422 A1 | 10/2002 | Sharma et al. | |
| 2002/0156970 A1 | 10/2002 | Stewart | |
| 2002/0171966 A1 | 11/2002 | Ottesen et al. | |
| 2002/0178326 A1 | 11/2002 | Ohta | |
| 2002/0184311 A1 | 12/2002 | Traversat | |
| 2002/0198891 A1 | 12/2002 | Li et al. | |
| 2002/0199075 A1 | 12/2002 | Jacobs | |
| 2003/0009538 A1 | 1/2003 | Shah | |
| 2003/0074550 A1 | 4/2003 | Wilks | |
| 2003/0101320 A1 | 5/2003 | Chauvel et al. | |
| 2003/0110357 A1 | 6/2003 | Nguyen | |
| 2003/0154314 A1 | 8/2003 | Mason, Jr. | |
| 2003/0154337 A1 | 8/2003 | Ohno et al. | |
| 2003/0158839 A1 | 8/2003 | Faybishenko et al. | |
| 2003/0177305 A1 | 9/2003 | Hetrick | |
| 2003/0191916 A1 | 10/2003 | McBrearty et al. | |
| 2003/0202377 A1* | 10/2003 | Harari et al. | 365/185.03 |
| 2003/0212660 A1 | 11/2003 | Kerwin | |
| 2003/0212857 A1 | 11/2003 | Pacheco et al. | |
| 2004/0003003 A1 | 1/2004 | McCartney et al. | |
| 2004/0003223 A1 | 1/2004 | Fortin | |
| 2004/0010639 A1 | 1/2004 | Inoue | |
| 2004/0015504 A1 | 1/2004 | Ahad et al. | |
| 2004/0019762 A1 | 1/2004 | Fukuoka | |
| 2004/0024795 A1 | 2/2004 | Hind et al. | |
| 2004/0034765 A1 | 2/2004 | James | |
| 2004/0044776 A1 | 3/2004 | Larkin | |
| 2004/0059747 A1 | 3/2004 | Olarig et al. | |
| 2004/0068627 A1 | 4/2004 | Sechrest | |
| 2004/0078508 A1 | 4/2004 | Rivard | |
| 2004/0093463 A1 | 5/2004 | Shang | |
| 2004/0103238 A1 | 5/2004 | Avraham et al. | |
| 2004/0107200 A1 | 6/2004 | Sjogren et al. | |
| 2004/0136259 A1* | 7/2004 | Klint | 365/232 |
| 2004/0148611 A1 | 7/2004 | Manion | |
| 2004/0153694 A1 | 8/2004 | Nicholson | |
| 2004/0162950 A1 | 8/2004 | Coulson | |
| 2004/0168018 A1 | 8/2004 | Aasheim et al. | |
| 2004/0172576 A1 | 9/2004 | Yoshii et al. | |
| 2004/0174631 A1 | 9/2004 | Tanaka et al. | |
| 2004/0221089 A1 | 11/2004 | Sato | |
| 2004/0230743 A1 | 11/2004 | Ware | |
| 2004/0243612 A1 | 12/2004 | Bailey | |
| 2005/0005188 A1 | 1/2005 | Hsu | |
| 2005/0021907 A1 | 1/2005 | Shimada | |
| 2005/0111260 A1 | 5/2005 | Nazarian | |
| 2005/0125708 A1 | 6/2005 | Simon | |
| 2005/0138283 A1 | 6/2005 | Garney | |
| 2005/0141284 A1 | 6/2005 | Futatsuyama | |
| 2005/0145923 A1 | 7/2005 | Chen et al. | |
| 2005/0149750 A1 | 7/2005 | Lisanke et al. | |
| 2005/0160223 A1* | 7/2005 | Chen et al. | 711/115 |
| 2005/0172067 A1 | 8/2005 | Sinclair | |
| 2005/0193160 A1 | 9/2005 | Bhatt | |
| 2005/0204091 A1* | 9/2005 | Kilbuck et al. | 711/103 |
| 2005/0228964 A1 | 10/2005 | Sechrest | |
| 2005/0235119 A1 | 10/2005 | Sechrest | |
| 2005/0239494 A1 | 10/2005 | Klassen et al. | |
| 2005/0246487 A1 | 11/2005 | Ergan | |
| 2005/0251617 A1* | 11/2005 | Sinclair et al. | 711/103 |
| 2005/0262378 A1 | 11/2005 | Sleeman et al. | |
| 2005/0286855 A1* | 12/2005 | Saitou et al. | 386/46 |
| 2006/0010293 A1 | 1/2006 | Schnapp | |
| 2006/0074953 A1 | 4/2006 | Dettinger | |
| 2006/0075185 A1 | 4/2006 | Azzarito | |
| 2006/0080553 A1 | 4/2006 | Hall | |
| 2006/0087893 A1* | 4/2006 | Nishihara et al. | 365/189.01 |
| 2006/0090031 A1 | 4/2006 | Kirshenbaum | |
| 2006/0106889 A1 | 5/2006 | Mannby | |
| 2006/0112195 A1* | 5/2006 | Aoyama | 710/10 |
| 2006/0112215 A1 | 5/2006 | Kim | |
| 2006/0136472 A1 | 6/2006 | Jujjuri | |
| 2006/0136664 A1 | 6/2006 | Trika | |
| 2006/0155931 A1 | 7/2006 | Birrell | |
| 2006/0177067 A1 | 8/2006 | Kim | |
| 2006/0236034 A1 | 10/2006 | Pomaranski | |
| 2006/0248276 A1 | 11/2006 | Kilian | |
| 2006/0248387 A1 | 11/2006 | Nicholson | |
| 2006/0277359 A1 | 12/2006 | Faber | |
| 2007/0005882 A1 | 1/2007 | Gallagher | |
| 2007/0011405 A1* | 1/2007 | Adusumilli | 711/122 |
| 2007/0043787 A1 | 2/2007 | Cannon | |
| 2007/0043929 A1 | 2/2007 | Safford | |
| 2007/0061511 A1 | 3/2007 | Faber | |
| 2007/0073764 A1 | 3/2007 | Oks et al. | |
| 2007/0150966 A1 | 6/2007 | Kirschner | |
| 2007/0156954 A1 | 7/2007 | Trika | |
| 2007/0207800 A1 | 9/2007 | Daley | |
| 2007/0208910 A1 | 9/2007 | Koseki | |
| 2007/0233939 A1 | 10/2007 | Kim | |
| 2007/0294474 A1 | 12/2007 | Panabaker | |
| 2008/0010401 A1 | 1/2008 | Royer, Jr. | |
| 2008/0010415 A1 | 1/2008 | Sawdey | |
| 2008/0162485 A1 | 7/2008 | Long | |
| 2008/0172519 A1 | 7/2008 | Shmulevich | |
| 2008/0183958 A1 | 7/2008 | Cheriton | |
| 2009/0144495 A1 | 6/2009 | Kirshenbaum | |
| 2009/0150335 A1 | 6/2009 | Latorre | |
| 2009/0150599 A1 | 6/2009 | Bennett | |
| 2009/0150611 A1 | 6/2009 | Fortin | |
| 2009/0287890 A1 | 11/2009 | Bolosky | |
| 2010/0070701 A1 | 3/2010 | Iyigun | |
| 2010/0070747 A1 | 3/2010 | Iyigun | |
| 2010/0082550 A1 | 4/2010 | Cong | |
| 2010/0199043 A1 | 8/2010 | Sechrest | |
| 2010/0199063 A1 | 8/2010 | Sechrest | |
| 2010/0217929 A1 | 8/2010 | Kirshenbaum | |
| 2011/0197016 A1 | 8/2011 | Cong | |
| 2011/0276743 A1 | 11/2011 | Kirshenbaum | |
| 2011/0314202 A1 | 12/2011 | Iyigun | |
| 2012/0047323 A1 | 2/2012 | Sareen et al. | |
| 2012/0102265 A1 | 4/2012 | Cong | |
| 2012/0173824 A1 | 7/2012 | Iyigun | |

FOREIGN PATENT DOCUMENTS

| | | |
|---|---|---|
| EP | 0 547 992 | 6/1993 |
| EP | 712067 A2 * | 5/1996 |
| EP | 0 744 697 | 11/1996 |
| EP | 1 960 888 B1 | 1/2013 |

(56) References Cited

FOREIGN PATENT DOCUMENTS

| | | |
|---|---|---|
| JP | 2001-250315 A | 0/2001 |
| JP | 2002-259186 A | 0/2002 |
| JP | 57-161933 | 10/1982 |
| JP | 60-140446 | 7/1985 |
| JP | 01-303547 | 12/1989 |
| JP | 02-039256 | 2/1990 |
| JP | 03-147157 | 6/1991 |
| JP | 03-294942 A | 12/1991 |
| JP | 04-205634 | 7/1992 |
| JP | 4-246746 A | 9/1992 |
| JP | 05-059537 | 3/1993 |
| JP | 5-82329 A | 3/1993 |
| JP | 5-94353 A | 4/1993 |
| JP | 05-158797 | 6/1993 |
| JP | 5-226066 A | 9/1993 |
| JP | 05-282889 | 10/1993 |
| JP | 06-035802 | 2/1994 |
| JP | 6-83708 A | 3/1994 |
| JP | 08-231043 A | 8/1994 |
| JP | 8-236351 A | 8/1994 |
| JP | 7-253935 A | 10/1995 |
| JP | 10-091488 A | 9/1996 |
| JP | 09-106366 | 4/1997 |
| JP | 09-146710 | 6/1997 |
| JP | 09-190382 | 7/1997 |
| JP | 10-040170 | 2/1998 |
| JP | 10-154101 | 6/1998 |
| JP | 10-289155 | 10/1998 |
| JP | 11-316699 | 11/1999 |
| JP | 11-338641 | 12/1999 |
| JP | 2000-148515 | 5/2000 |
| JP | 2001-27967 A | 1/2001 |
| JP | 2001-67258 A | 3/2001 |
| JP | 2002-007185 | 1/2002 |
| JP | 2002-342037 | 11/2002 |
| JP | 2003-076498 | 3/2003 |
| JP | 2003-085041 | 3/2003 |
| JP | 2003-196032 | 7/2003 |
| JP | 2003-280950 | 10/2003 |
| JP | 2003-316647 | 11/2003 |
| JP | 2004-021370 | 1/2004 |
| JP | 2004-054845 | 2/2004 |
| JP | 2004-272324 | 9/2004 |
| JP | 2005-044010 | 2/2005 |
| JP | 2005-222383 | 8/2005 |
| JP | 2007-007185 | 1/2007 |
| JP | 2008-052321 | 3/2008 |
| KR | 101999001937 | 3/1999 |
| KR | 102000003972 | 5/2000 |
| RU | 2010317 | 3/1994 |
| TW | 473194 B | 3/2002 |
| TW | 502165 B | 9/2002 |
| WO | WO 93/18461 A1 | 9/1993 |
| WO | WO 97/26600 | 7/1997 |
| WO | 98/10611 | 3/1998 |
| WO | WO 2001111486 A2 | 2/2001 |
| WO | WO 01/57675 A1 | 8/2001 |
| WO | WO 01/57875 A1 | 8/2001 |
| WO | WO 2001175581 A1 | 10/2001 |
| WO | WO 2002101364 A2 | 1/2002 |

OTHER PUBLICATIONS

"Optimization of CF Host Operaiton," SanDisk Corporation 2005, http://www.sandisk.com/pdf/oem/AppNoteCFHostv1.0.pdf.
"Optimizing Program/Erase Times," Spansion, Sep. 2, 2004, http://www.spansion.com/applicaiton_notes/Min_FacProgErase_Accel_AppNote_A0_E.pdf.
Written Opinion for PCT/US2006/048402 mailed May 8, 2007.
International Search Report for PCT/US2006/048402 mailed May 8, 2007.
Supplementary European Search Resort for EP 06 83 9426 mailed May 11, 2009.
JP Notice of Rejection for Application No. 2005-306948, Mar. 11, 2011.
EP Communication for Application No. 05109295.5-2201, reference EP36830RK900dfi, Jun. 8, 2007.
"Memory Accelerator," NewScientist.com, printed Aug. 26, 2005.
Anderson, "A Case for Buffer Servers," Hot Topics in Operating Systems, Proceedings of the Seventh Workshop on Rio Rico, AZ, Mar. 29-30, 1999, XP010355835.
EP Summons to attend oral proceedings, reference EP36830RIK900dfi, for Application No. 05109295.5-2201 / 1650666, Mar. 8, 2012.
CN First Office Action for Application No. 200680047384.6, Jan. 22, 2010.
CN First Office Action for Application No. 200510116208.0, Jun. 6, 2008.
CN Decision on Rejection for Applicaion No. 200680047384.6, Nov. 11, 2010.
JP Notice of Reasons for Rejection, Application No. 2008-545888, Apr. 19, 2012.
Motoazabu, "IEEE1394: A Dream Interface at the Turning Point", PC USER, Japan, Oct. 24, 1999.
EP Provision of the minutes of the oral proceedings for Application No. 05 109 295.5-2201, Reference EP36830RK900dfi, Aug. 7, 2012.
EP Decision to refuse a European Patent for Application No. 05 109 295.5-2201, Reference EP36830RK900dfi, Aug. 7, 2012.
CN First Office Action for Application No. 200510083792.4, Feb. 1, 2008.
CN Second Office Action for Application No. 200510083792.4, Jun. 27, 2008.
EP Communication for Application No. 05103697.8-2201, Reference EP34979TE900dfi, May 21, 2007.
EP Communication for Applfication No. 05 103 697.8-2201, Reference EP34979TE900dfi, Oct. 26, 2007.
EP Communication for Application No. 05 103 697.8-2201, Reference EP34979TE900dfi, Jun. 17, 2008.
EP Communication for Application No. 05 103 697.8-2201, Reference EP34979TE900dfi, Nov. 7, 2008.
JP Notice of Rejection for Application No. 2005-135274, Sep. 24, 2010.
JP Notice of Rejection for Application No. 2005-135274, Sep. 9, 2011.
Search Report for Taiwan Patent Application No. 094114140, Nov. 22, 2011, 2 pages.
Notice of Rejection dated Jan. 25, 2011 in Japanese Patent Application No. 2005-134492.
"Computervision Launches Design Automation Development Platform for Windows, UNIX Desktop Applications", PR Newswire, Financial News, Jan. 10, 1995, 3 pages.
"Developer's Guide to Apple Data Detectors-For Version 1.0.2", Apple Computer, Inc., 1977, 1-34.
"Mechanical Design Software (Buyers Guide)", Computer-Aided Engineering, Dec. 1993, 12(12), 32-36.
"Oracle 9i SQL Reference", Release 2 (9.2), Oct. 2002, 29 pages.
Anderson et al., "Referential Integrity Implementation Details and Advantages", IBM Technical Disclosure Bulletin, Mar. 1, 1995, 38(3), 477-487.
Andrews et al., "Combining Language and Database Advances in an Object-Oriented Development Environment", Conference on Object Oriented Programming Systems Languages and Applications, Orlando, Florida, United States, Oct. 4-8, 1987, 430-440.
Ballard et al., "Improved Recovery From Partial Page Writes of Data Pages", IBM technical Disclosure Bulletin, May 1, 1993, 36(5), 141-143.
Beard et al., "Multilevel and Graphical Views of Metadata", Fifth International Forum on Research and Technology Advances in Digital Libraries, Santa Barbara, California, Apr. 22-24, 1998, 256-265.
Beitner et al., "Multimedia Support and Authoring in Microcosm: an extended model", Department of Electronics and Computer Science, University of Southampton, 1994, 12 pages.
Berg, "How Do I Create Persistent Java Objedts?", Dr. Dobb's Journal, 1997, 22(4), 98-101.
Bhattacharya et al., "Coordinating Backup/Recovery and Data Consistency Between Database and File Systems", International Conference on Management of Data, Madison, Wisconsin, USA, Jun. 4-6, 2002, 12 pages.

(56) References Cited

OTHER PUBLICATIONS

Biliris, "The Performance of Three Database Storage Structures for Managing Large Objects", ACM SIGMOD, 1992, 21(2), 276-285.
Booch, "Object-Oriented Analysis and Design with Applications", Cummings Publishing Co., 1994, 155-156 and 179-183.
Bracchi et al., "Binary Logical Associations in Data Modelling", Modelling in Data Base Management Systems G.M. Nijssen, (ed), Proceeding of the IFIP Working Conference on Modelling in Data Base Management Systems, Freudenstadt, Germany, Jan. 5-8, 1976, 125-147.
Bullock et al., "Recovery of Data Pages after Partial Page Writes", IBM Technical Disclosure Bulletin, Aug. 1991, 34(3), 34(3), 69-83.
Buneman et al., "Inheritance and Persistence in Database Programming Languages", International Conference on Management of Date, Washington, D.C., United States, 1986, 4-15.
Cammarata et al., "Extending a relational database with deferred referential integrity checking and intelligent joins", SIGMOD Record USA, Jun. 1989, 18(2), 88-97.
Chien, "Concurrent Aggregates (CA)—Design and Experience with a Concurrent Object—Oriented Language Based on Aggregates", Journal of Parallel and Distributed Computing, Mar. 1995, 25(2), 174-196.
Chryssostomidis et al., "Geometric Modeling Issues in Computer Aided Design of Marine Structures", Marine Technology Society Journal, Dec. 1988, 22(2), 15-33.
Ciccozzi, "Microsoft Press Computer Dictionary", 1997, 3, 39-40.
D'Andrea et al., "UniSQL's next-generation object-relational database management system", ACM SIGMOD Record, Sep. 1996. 25(3). 70-76.
Darby, "Object Serialization in Java 1.1. Making Objects Persistent", WEB Techniques, 1997, 2(9), 55 and 58-59.
Dietrich, Jr., et al., "TGMS: An Object-Oriented System for Programming Geometry", Software-Practice and Experience, Oct. 1989, 19(10), 979-1013.
Dobashi et al, "Skylight for Interior Lighting Design", Computer Graphics Forum, Aug. 1994, 13(3), 85-96.
Dorsch, "Accel Signs with IBM to Buy Altium PCB Unit", EDA Licensing, Electronic New, Jan. 16, 1995, 3 pages.
EP Application No. 05103690: Partial European Search Report, Apr. 28, 2008, 7 pages.
Fegaras et al., "Optimizing Object Queries Usingan Effective Calculus", ACM Transactions on Database Systems (TODS), Dec. 2000, 25(4), 457-516.
Findler et al., "Contract soundness for Object-Oriented Languages", ACM Conference on Object-Oriented Programming Systems, Languages, and Applications (OOPSLA), Nov. 2001, 36(11), 15 pages.
Foley et al., "Computer Graphics: Principles and Practices", Second Edition, Addison-Wesley Publishing Company, 1990, Chapter 5 and 9, 201-283.
Friis-Christensen et al., "Requirements and Research issues in Geographic Data Modeling", Proceedings of the 9th ACM international symposium on Advances in geographic information systems, Atlanta, Georgia, USA, Nov. 9-10, 2001, 7 pages.
Fuh et al., "Implementation of SQL3 Structured Types with Inheritance and Value Substitutability", Digital Symposium Collection 2000 (Abstract only), 2000, 2 pages.
Garret, Jr., et al., "An Object Oriented Environment for Representing Building Design and Construction Data", Advanced Construction Technology Center, Document No. 89-37-04, Jun. 1989, 1-34.
Goscinski, "Distributed Operating Systems: The Logical Design", Addison-Wesley Longman Publishing Co., Inc. 1991, 306-313.
Harrison et al., "Structure Editors: User-Defined Type Values and Type Inference", International Conference on Software Methods and Tools, 2000, Wollongong, NSW , Australia, Nov. 6-9, 2000, 241-247.
Haverlock, "Object Serialization, Java, and C++", Dr. Dobb 's Journal, Aug. 1, 1998, 23(8), 5 pages.
Hay, "Data Model Patterns: Convention of Thought", Dorset House Publishing, New York, NY, 1996, 47-67 and 235-259.
Hernandez et al, "The Merge/Purge Problem for Large Databases", International Conference on Management of Data and Symposium on Principles of Database Systems, Proceedings of the 1995 ACM SIGMOD International Conference on Management of Data, May 1995, 24(2), 12 pages.
Hsiao et al., "DLFM: A Transactional Resource Manager", International Conference on Management of Data, 2000, 518-528.
Kaneko et al., "Design of 3D CG Data Model of Move Animation Database System", Advanced Database Research and Development Series, Proceedings of the Second Far-East Workshop On Future Database Systems, 1992, 2, 364-372.
Kaneko et al., "Towards Dynamics Animation on Object-Oriented Animation Database System Move", Advanced Database Research and Development Series, Proceedings of the 3rd International Conference on Database Systems for Advanced Applications (DASFAA), 1993, 4, 3-10.
Katz, "Toward a Unified Framework for Version Modeling in Engineering Databases", ACM Computing Surveys (CSUR), Dec. 1990, 22(4), 375-408.
Kawabe er al., "A Framework for 3D Modeling Constraint-Based Description and Non-Manifold Geometric Modeling", A Colletion of Contributions based on Lectures Presented at the 2nd Toyta Conference, Organization of Engineering Knowledge for Product Modeling in Computer Integrated Manufacturing, Japan, Oct. 2-5, 1988, 325-357.
Kempfer, "CAD Jumps on Windows 3.1 Bandwagon", Computer Aided Engineering, 1993, 24-25.
Khan et al., "A Performance Evaluation of Storing XML Data in Relational Database Management Systems", WIDM, 2001, 31-38.
Khoshafian et al., "Objeft Identify", OOPSLA'86, 1986, 21, 406-416.
Kiesling, "ODBC in UNIX Environments", Dr. Dobb's Journal, Dec. 2002, 27(12), 16-22.
King et al., "TriStarp—An Investigation into the Impementation and Exploitation of Binary Relational Storage Structures", Proceedings of 8.sup.th (BNCOD) British National Conference On Data Bases, 1990, 64-84.
Krouse, "Geometric Models for CAD/CAM", Machine Design, Jul. 24, 1990, 99-105.
LeBlanc et al., "Design Data Storage and Extraction Using Objects", Concurrent Engineering: Research and Applications, 1993, 1, 31-38.
Leontiev et al., "On Type Systems for Object-Oriented Database Programming Languages", ACM Computing Surveys, Dec. 2002, 34(4), 1-50.
Levy et al., "Incremental Recovery in Main Memory Database Systems", IEEE Transactions on Knowledge and Data Engineering, Dec. 1992, 4(6), 529-540.
Lim et al., "Transaction Processing in Mobile, Heterogeneous Database Systems", IEEE Transactions on Knowledge and Data Engineering, Nov. 2002, 14(6), 1330-1346.
Mallet et al., "Myrtle: A Set-Oriented Meta-Interpreter Driven by a "Relational" Trace or Deductive Databases Debugging", Lecture Notes in Computer Science, 1999, 1559, 1-22.
Mariani, "Oggetto: An Object Oriented Database Layered on a Triple Store", The Computer Journal, 1992, 35(2), 108-118.
McMahon, "SED-A Non-Interactive Text Editor", Bell Laboratories, Aug. 15, 1978, 10 pages.
Melton et al., "SQL and Management of External Data", ACM SIGMOD Record, Mar. 2001, 30(1), 8 pages.
Mitchel, "The Logic of Architecture", Massachusetts Institute of Technology. 1990, 139-143.
Navathe, "Evolution of Data Modeling for Databases", Communications of the ACM, Sep. 1992, 35(9), 112-123.
Nelson et al., "Generic Support for Caching and Disconnected Operation", 4$^{th}$ Workshop on Workstation Operating Systems (WWOS-IV), Napa, CA , USA, Oct. 14-15, 1993, 5 pages.
Nijssen et al, "Conceptual Schema and Relational Database Design", A Fact Oriented Approach, Department of Computer Science, University of Queensland, Prentice Hall, 1989, 10-33, 42-43, 48-51, 156-170.
Orenstein et al., "Query Processing in the Object Store Database System", ACM SIGMOD, International Conference on Management of Data, Jun. 1992, 21(2), 403-412.

(56) References Cited

OTHER PUBLICATIONS

Ottogalli et al., "Visualisation of Distributed Applications for Performance Debugging", Lecture Notes in Computer Science, Jan. 2001, 2074, 831-840.
Pachet et al., "A Combinatorial Approach to Content-Based Music Selection", Multimedia Computing and Systems, Florence, Jul. 1996, 1, 6 pages.
Papiani et al. "A Distributed Scientific Data Archive Using the Web, XML and SQL/MED", SIGMOD Record, Sep. 1999, 28(3), 7 pages.
Ponnekanti et al., "Online Index Rebuild", AMC SIMOD International Conference on Management of Data, Dallas, Texas, United States, 2000, 529-538.
Powell, "Object, References, Identifiers. and Equality White Paper", OMG TC Document 93.7.5. Jul. 2, 1993. 1-24.
Prosise, "2-D Drafting: Why Pay More?", PC Magazine: The Independent Guide to IBM-Standard Personal Computing, 1993, 12(4), 255-289.
Ramsey et al., "An Algebraic Approach to File Synchroniation", Software Engineering Notes, Association for Computing Machinery, Sep. 2001, 26(5), 175-185.
Read, III, "Developing the Next Generation Cockpit Display System", IEEE, Aerospace and Electronics Systems Magazine. Oct. 1996, 11(10), 25-28.
Reiner et al., "Benefits of X-based Three-Tier Client/Server Model with ESRI Applications", Virtual Solutions, 1995, 9 pages.
Rosenblum et al., "The Design and Implementation of a Log-Structured File System", Proceedings of the 13th ACM Symposium on Operating Systems Principles, Jul. 24, 1991, 1-15.
Rouse, "CAD Pioneers are Still Trailblazing", Machine Design, Oct. 22, 1987, 59(25), 117-122.
Roussopoulos et al., "Using Semantic Networks for Data Base Management", Proceedings of the 1st International Conference on Very Large Data Bases, 1975, 144-172.
Santos et al., "Computer Aided Mechanical Engineering Design Environment for Concurrent Design Process", Proceedings of the 1993 ITEC Workshop on Concurrent Engineering, Simulation in Concurrent Engineering, May 4-6, 1993, 71-83.
Seshadri, "Enhanced Abstract Data Types in Object-Relational Databases", The VLDB Journal, The International Journal on Very Large Databases, Aug. 1998, 7(3), 130-140.
Simoes et al, "A RISC-Microcontroller Based Photovoltaic System for Illumination Applications", Fifteenth Annual IEEE: Applied Power Electronics Conference and Exposition (APEC 2000), New Orleans, LA , USA, Feb. 6-10, 2, 1151-1156.
Simon, "Strategic Database Technology: Management for the Year 2000", Morgan Kaufmann Publishers. 1995, 446 pages.
Singhal et al., "DDB: An Object Design Data Manager for VLSI CAD", Proceedings of the 1993 ACM SIGMOD international conference on Management of data, Washington, D.C., United States, 1993, 467-470.
Sreekanth et al., "A Specification Environment for Configuring a Discrete-Part Manufacturing System Simulation Infrastructure", International Conference on Systems, Man and Cybernetics, Le Touquet , France, Oct. 17-20, 1993, 1, 349-354.
Sreenath, "A Hybrid Computation Environment for Multibody Simulation", Mathematics and Computers in Simulation, Aug. 1992, 34(2), 121-140.
Stevens, "Value in 3-D", Industry Week, Jan. 8, 1995, 45-46.
Stonebraker, "The Case for Partial Indexes", SIGMOD Record, Dec. 1989, 18(4), 8 pages.
Strickland, "Intersection of Relational and Object", Proceedings of the AM/FM International Conference XVII, Mar. 14-17, 1994, 69-75.
Sutherland et al., "The Hybrid Object-Relational Architecture (HORA): An Integration of Object-Oriented and Relational Technology", Proceedings of the 1993 ACM/SIGAPP symposium on Applied computing: states of the art and practice, Indianapolis, Indiana, United States, 1993, 326-333.
Suzuki et al., "Geometric Modeling for Modeling Products", Proceedings of the Third International Conference on Engineering Graphics and Descriptive Geometry, Vienna Austria, Jul. 11-16, 1988, 2, 237-243.
Taylor et al. "An Integrated Robot System Architecture", Proceedings of the IEEE. Jul. 1983, 71(7), 842-856.
Variams et al, "Bridging XML-Scherna and Relationai Databases, A System for generating and Manipulating Relational Databases using, Valid XML documents", DocEng'01, Nov. 9-10, 2001, 10 pages.
Watanabe, "Knowledge Integration for Architectural Design", Knowiedge-Based Computer-Aided Architectural Design, 1994, 123-146.
Waugh, "Specifying Metadata Standards for Metadata Tool Configuration", Computer Networks and ISDN Systems, Apr. 1998, 20(1-7), 23-32.
Wilcox, "Object Databases-Object Methods in Distributed Computing", Dr. Dobbs Journal, Nov. 1994, 19(13), 26-34.
Wold et al., "Content-Based Classification, Search, and Retrieval of Audio", IEEE Multimedia, 1996, 3(3), 27-36.
Yoshikawa et al., "XBel: A Path-Based Approach to Storage and Retrieval of XML Documents Using Relational Databases", ACM Transactional on Internet technology, Aug. 2001, 1(1), 1-29.
JP Notice of Reasons for Rejection for Application No. 2008-545888, Aug. 29, 2012.
IL Notification of Defects in Patent Application No. 191502, Feb. 17, 2013.
EP Communication for Application No. 06 339 426.1-1229, Reference FB20211, Sep. 2, 2011.
EP Communication for Application No. 06 839 426.1-1229, Reference FB20211, Oct. 26, 2011.
FOX, "Invention: The Phantom Car", NewScientist.com, Aug. 17, 2005.
PCT international Search Report and Written Opinion for Application No. PCT/US06/26373, Reference 313462.07WO, May 11, 2007.
AU Examiner's First Report for Application No. 2005219500, Reference 12671530/DBW, May 31, 2010.
CN Notice on the First Office Action for Application No. 200980145878.1, Jan. 29, 2013.
EP Communication for Application No. 03 022 573.4-1229, Reference EP28554-/df, Aug. 2, 2007.
EP Communication for Application No. 05 109 295.5-2201, Reference EP3683ORK900dfi, Jan. 28, 2008.
EP Communication for Application No. 05 109 295.5-2201, Reference EP3683ORK900dfi, Oct. 28, 2008.
EP Communication for Application No. 05 109 295.5-2201, Reference EP3683ORK900dfi, Jun. 12, 2012.
EP Communication for Application No. 05 109 295.5-2201, Reference EP3683ORK900dfi, Jun. 15, 2012.
Fortin, "External Memory Devices (EMD)", Jun. 17, 2004.
Fortin, "Apparatus and Method to Decrease Boot Time and Hibernate Awaken Time of a Computer System Utilizing Disk Spin-Up-Time", U.S. Appl. No. 10/186,164, Filed Jun. 27, 2002.
JP Final Rejection for Application No. 2005-306948, Jan. 13, 2012.
Kirshenbaum, "Using External Memory Devices to Improve System Performance" U.S. Appl. No. 10/970,772, Filed Oct. 21, 2004.
Kirshenbaum, "Using External Memory Devices to Improve System Performance", U.S. Appl. No. 12/366,112, Filed Feb. 5, 2009.
Kirshenbaum, "Using External Memory Devices to Improve System Performance", U.S. Appl. No. 12/775,168, Filed May 6, 2010.
Kirshenbaum, "Using External Memory Devices to Improve System Performance", U.S. Appl. No. 13/187,757, Filed Jul. 21, 2011.
KR Notice of Preliminary Rejection for Application No. 10-2005-0099666, Apr. 30, 2012.
KR Office Action for Application No. 10-2005-0099666, Nov. 26, 2012.
RU Official Action for Application No. 2003129662/09(031875), Sep. 14, 2007.
CN Notice on the Second Office Action for Application No. 200980137190.9, Mar. 20, 2013.
CA Examiner's Report for Application No. 2,523,761, Feb. 26, 2013.
JP Notice of Rejection for Application No. 2012-111004, May 14, 2013.

(56) References Cited

OTHER PUBLICATIONS

KR Reasons for Rejection for Application No. 10-2008-7014092, Reference 314396.08, May 30, 2013.
JP Notification of Reason(s) for Refusal for Application No. 2012-111004, Nov. 19, 2013.
KR Final Notice of Preliminary Rejection for Application No. 10-2008-7014092, Nov. 28. 2013.
JP Notice of Reasons for Rejection for Application No. 2011-526951, Dec. 16, 2013.
JP Notice of Rejection for Application No. 2003-347507, Mar. 26, 2010.
JP Notice of Rejection for Application No. 2003-347507, Nov. 30, 2010.
CA Office Action for Application No. 2,442,188, Mar. 10, 2010.
AU Examiner's first report on patent application No. 2003243990, Jan. 23, 2009.
KR Notice of Preliminary Rejection for Application No. 10-2003-69015, Nov. 30, 2009.
RU Official Action for Application No. 2003129662, Sep. 14, 2007.
MX Office Action for Application No. PA/a/2003/008766, Jul. 28, 2007.
EP Communication for Application No. 03022573.4-1229, Reference EP28554-/df, Aug. 2, 2007.
EP Communication for Application No. 03 022 573.4-1229, Reference EP28554-/df, Nov. 8, 2007.
EP Communication for Application No. 03 022 573.4-1229, Reference EP28554-/df, Oct. 6, 2008.
EP Communication for Application No. 03 022 573.4-1229, Reference EP28554-/df, Jul. 14, 2010.
CA Office Action for Application No. 2,723,077, Jan. 9, 2013.
AU Examiner's first report on patent application No. 2010201717, Jun. 28, 2011.
JP Decision to Decline the Amendment for Application No. 2005-135274, Jul. 3, 2012.
JP Final Rejection for Application No. 2005-135274, Jul. 3, 2012.
CN Decision on Rejection for Application No. 200980136912.9, Aug. 1, 2013.
CN Notice on the Third Office Action for Application No. 200980137190.9, Aug. 1, 2013.
CN Notice on the Second Office Action for Application No. 200980145878.1, Sep. 16, 2013.
EP Communication for Application No. 09813565.0-1229/2329360 PCT/US2009056419, Reference FB24240, Apr. 3, 2012.
EP Communication for Application No. 09826570.5-1229/2353081 PCT/US2009063127, Reference FB24586, May 29, 2012.
Budiu, "A Dual-Disk File System: ext4", Apr. 16, 1997.
CN Notice on the First Office Action for Application No. 200980137190.9, Oct. 24, 2012.
Dove, "Windows XP for embedded applications", Jul. 10, 2008.
EP Communication for Application No. 09814983.4-2224/2329361 PCT/US2009055198, Reference FB24231, Oct. 10, 2012.
iSCSI, "Performance evaluations of iSCSI implementation", printed Jan. 10, 2008.
JP Notice of Rejection for Application No. 2011-527865, Oct. 16, 2012.
Matthews, "Improving File System Performance With Adaptive Methods", Fall 1999.
Mitchell, "Managing Cache Coherence in Multiprocessor Computer Systems", printed Jul. 10, 2008.
Nieplocha, "ARMCI: A Portable Aggregate Remote Memory Copy Interface", Oct. 30, 2000.
Novell NetWare® 6, "Novell Storage Services Administration Guide", Feb. 2002.
PCT International Search Report and Written Opinion for Application No. PCT/US2009/055198, reference 324268-02WO, Feb. 26, 2010.
CN Notice on the First Office Action for Application No. 200980136912.9, Jan. 14, 2013.
Ohn, "Path conscious caching of B+ tree indexes in a shared disks cluster", ScienceDirect, Available online Dec. 15, 2006.
PCT International Search Report and Written Opinion for Application No. PCT/US2009/056419, reference 325076-03WO, Mar. 12, 2010.
PCT International Search Report and Written Opinion for Application No. PCT/US2009/063127, reference 325668-02WO, May 31, 2010.
Zhu, "Power Aware Storage Cache Management", IEEE Transactions on Computers, May 2005.
Bisson, "A Hybrid Disk-Aware Spin-Down Algorithm with I/O Subsystem Support", IEEE International Performance, Computing, and Communications Conference, Apr. 11-13, 2007.
Huffman, "Non-Volatile Memory Host Controller Interface (NVMHCI) 1.0", Apr. 14, 2008.
Greenan, "CompulsiveFS: Making NVRAM Suitable for Extremely Reliable Storage", Proceedings of the 5th USENIX Conference on File and Storage Technologies, Feb. 13-16, 2007.
Darden, "Data Integrity: The Dell|EMC Distinction", May 2002.
Archer, "ReadyBoost—Using Your USB Key to Speed Up Windows Vista", Apr. 14, 2006.
Archer, "ReadyBoost Q&A", Jun. 2, 2006.
Allchin, "Microsoft Explains Vista ReadyBoost", CDRinfo, Nov. 21, 2006.
Vitter, "External Memory Algorithms", Proceedings of the Seventeenth ACM SIGACT-SIGMOD-SIGART Symposium on Principles of Database Systems, Jun. 1-3, 1998.
Ekman, "TLB and Snoop Energy-Reduction using Virtual Caches in Low-Power Chip-Multiprocessors", Proceedings of the 2002 International Symposium on Low Power Electronics and Design, Aug. 12-14, 2002.
IN First Examination Report for Application No. 1086/DEL/2005, Sep. 10, 2013.
JP Notice of Rejection for Application No. 2012-243915, Jul. 9, 2013.
MY Adverse Report for Application No. PI 20081667, Aug. 30, 2013.
JP Finai Notification of Reason(s) for Refusal for Application No. 2012-243915, Mar. 25, 2014.
CA Office Action for Application No. 2,523,761, Feb. 26, 2014.
JP Notice of Reason for Rejection for Application No. 2011-526951, Jul. 11, 2014.
CN Decision on Rejection for Application No. 200980145878.1, Apr. 4, 2014.

* cited by examiner

OPTIMIZING WRITE AND WEAR PERFORMANCE FOR A MEMORY

BACKGROUND

Memory device have many trade offs. Memory which is fast may be expensive. Memory which is slow may be inexpensive. As the memory demands of modern applications exceed the physical capacity of customer systems, paging operations to the hard drive quickly make the system and applications appear slow and unresponsive, particularly when switching between tasks or users. In an ideal computer, all the memory would be as fast as possible, but such a computer would be too expensive to be realistic. In addition, there are some applications where cheap, long term storage is all that is needed. As a result, computers have a variety of memory from ultra fast memory close to the processor to slower memory such as disk based memory. In addition, computers have the ability to add more and different types of memory such as portable hard drives, floppy disks and flash memory devices. Each of these devices have performance and wear characteristics which may be maximized.

SUMMARY

Determining and using the ideal size of memory to be transferred from high speed memory to a low speed memory may result in speedier saves to the low speed memory and a longer life for the low speed memory. For example, some flash memory devices have memory write sizes that minimize the number of erases and writes to the flash memory. Other low speed memory devices may have ideal write sizes that enable large blocks on the low speed memory to store contiguous data. In addition, data may be accessed in fast memory even thought though the data has been indicated to be sent to lower speed memory.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
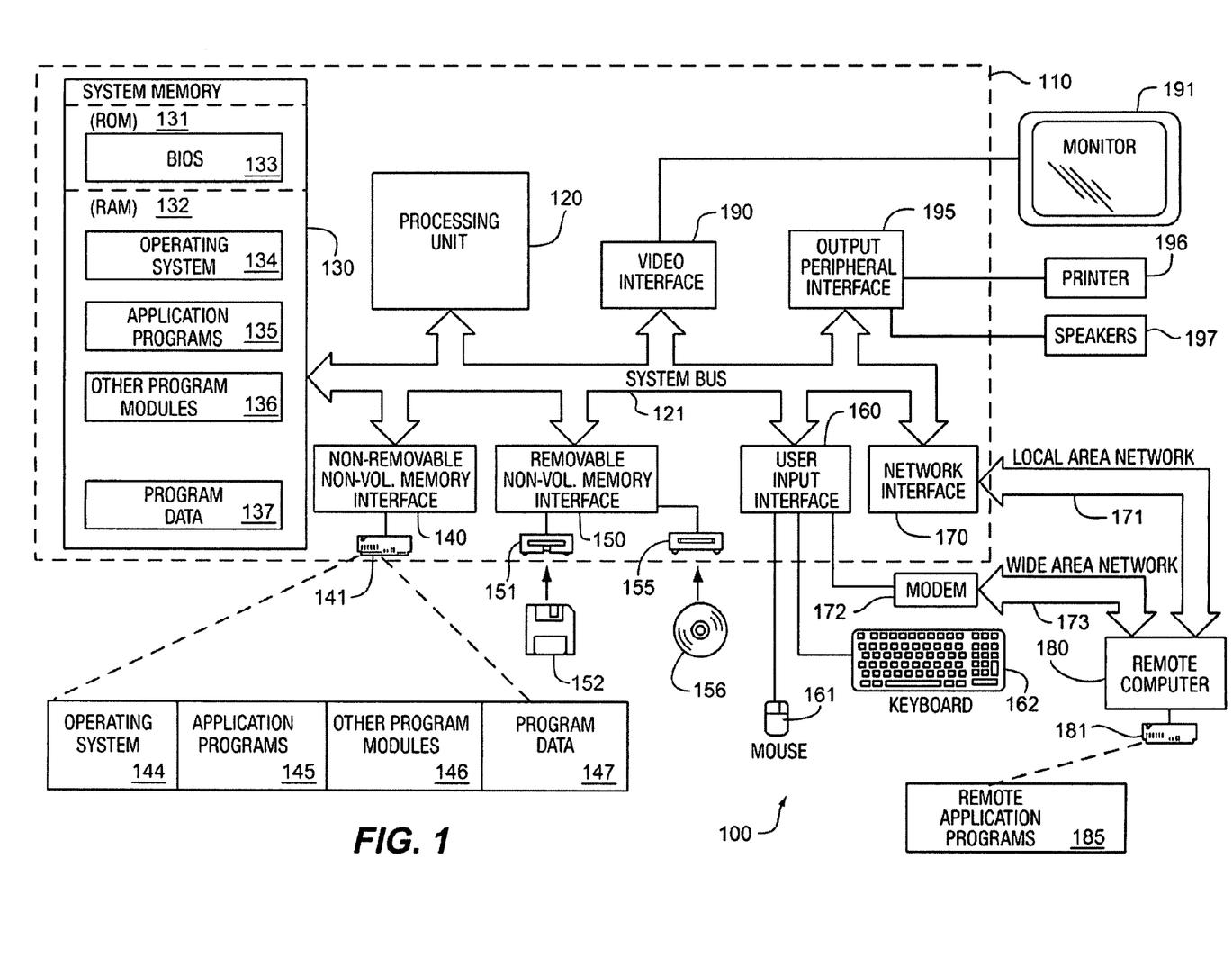
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
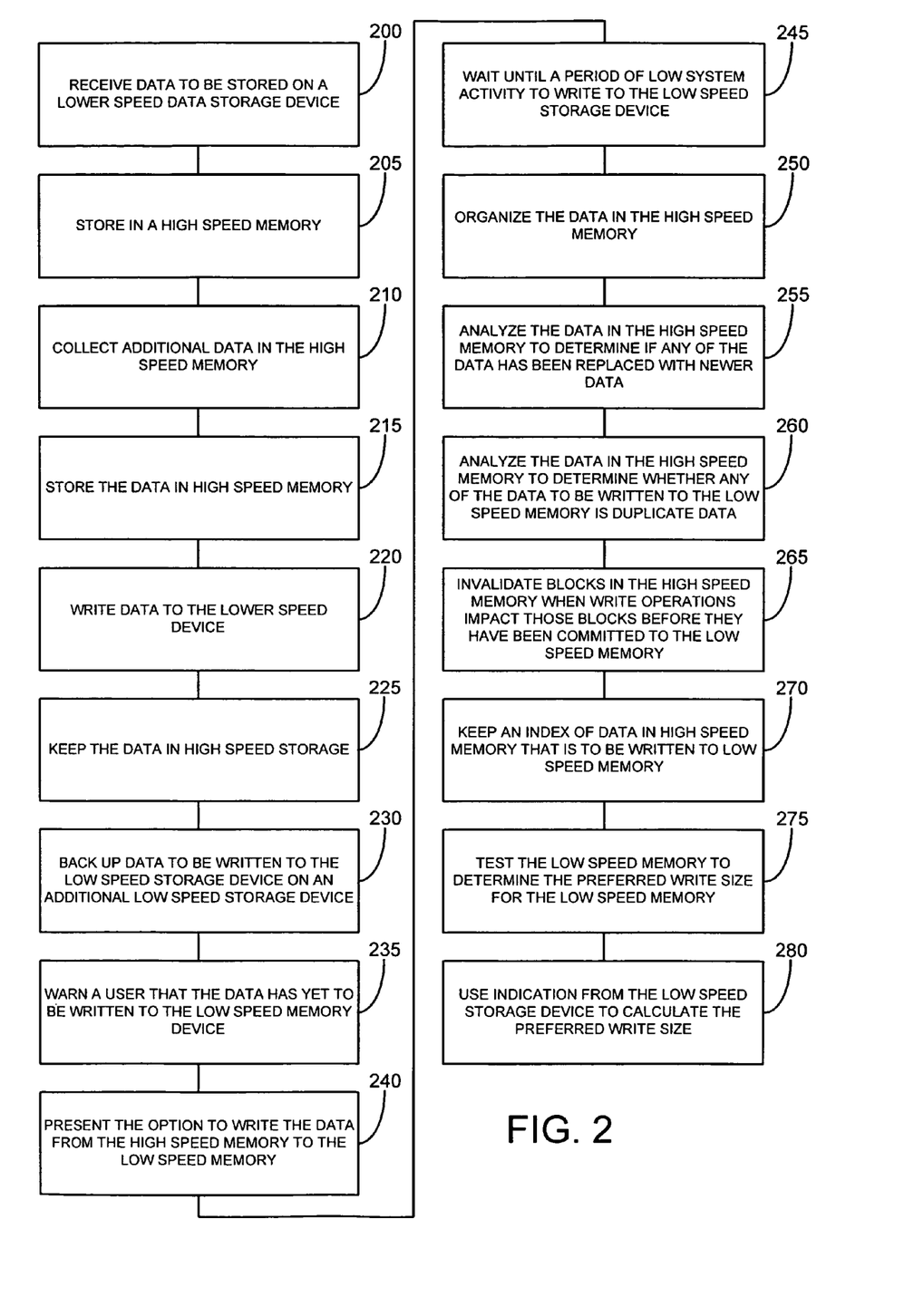
FIG. 2 is a diagram of a method in accordance with the claims.

FIG. 2 may illustrate a method of efficiently storing data where there is a plurality of data storage devices with a hierarchy of data storage speeds. Memory device have many trade offs. Memory which is fast may be expensive. Memory which is slow may be inexpensive. In an ideal computer, all the memory would be as fast as possible, but such a computer would be too expensive for a majority of uses. In addition, there are some applications where cheap, long term storage is all that is needed. As a result, computers have a variety of memory from ultra fast memory close to the processor to slower memory such as disk based memory. In addition, computers have the ability to add more and different types of memory such as portable hard drives 140 and flash memory devices 152. Each of these devices have performance and wear characteristics which may be maximized.

For example, flash memory 152 is made in two common forms: NOR flash and NAND flash. Other forms of flash memory 152 are also contemplated. Both types of flash memory 152 and EEPROM wear out after many erase operations, due to wear on the insulating oxide layer around the charge storage mechanism used to store data. A typical NOR flash memory 152 unit may wear out after 10,000-100,000 erase/write operations, a typical NAND flash 152 memory may wear out after 1,000,000. One limitation of flash memory 152 is that, although it can be read or programmed a byte or a word at a time in a random access fashion, it must be erased a "block" at a time. Starting with a freshly erased block, any byte within that block can be programmed. However, once a byte has been programmed, it cannot be changed again until the entire block is erased. When compared to a hard disk drive 140, flash memory 152 is limited in that it has a finite number of erase-write cycles, so that care has to be taken to minimize the number of erase/write cycles.

In other devices, the slowness of the write cycle may be a factor in determining a preferred write size. For example, if there is significant overhead time required to set up a write function, time could be saved by minimizing the number of writes by maximizing the size of the data to be written. Similarly, in some storage devices, repeated small saves can result in data being spread out across the storage device, which may result in longer read times than if the data was stored contiguously as may be the result of fewer, larger saves. In addition, the write cycle may be taxing on the processor and during times of high processor usage, it may make sense to save less frequently with larger storage sizes at less frequent intervals.

Referring again to hard drives 140, if there were no high speed memory, every write to the hard disk 140 may involve a performance hit while the system waits for the hard disk 140 to access the correct location on the hard disk 140 and write the data. This may take at least 10 milliseconds on most drives, which is a long time in the computer world and may really slow down performance as the system waits for the hard disk.

When high speed memory is available such as RAM 132 (also referred to as write caching enabled), when the system sends a write to the hard disk 140, the logic circuit records the write in its much faster cache or high speed memory 132, and then immediately sends back an acknowledgement to the operating system saying, in essence, "finished." The rest of the system can then proceed on without having to wait for the actuator to position and the disk to spin, and so on which improves performance. However, the drive 140 sends back saying "finished" when it really isn't finished—the data isn't on the disk at all, it's only in the cache 132. The hard disk's 140 logic circuits begin to write the data to the disk, but of course this takes some time.

Typical PC 110 use involves loading programs, and loading and saving data frequently. All of these operations may require access to the hard disk 140. And therefore, hard disk 140 performance becomes an issue. Making the CPU 120 fast enough to process two million instructions while it waits doesn't really gain a user much unless it has something to do with that time. The applications where hard disk 140 performance issues are most important are those that do a lot of reading and writing to the hard disk 140, instead of doing a lot of processing, such as multimedia editing applications, especially those dealing with large audio and video files.

Access time is the metric that represents the composite of all the other specifications reflecting random performance positioning in the hard disk 140. The most common definition is:

Access Time=Command Overhead Time+Seek Time+ Settle Time+Latency

Command overhead may refer to the time that elapses from when a command is given to the hard disk 140 until something actually starts happening to fulfill the command. The seek time of a hard disk 140 may measure the amount of time required for the read/write heads to move between tracks over the surfaces of the platters. Switching between tracks requires the head actuator to move the head arms physically, which being a mechanical process, takes a specific amount of time. The amount of time required to switch between two tracks depends on the distance between the tracks. However, there is a certain amount of "overhead" involved in track switching, so the relationship is not linear. It may not take double the time to switch from track 1 to track 3 that it does to switch from track 1 to track 2.

Seek time is normally expressed in milliseconds (commonly abbreviated "msec" or "ms"). Of course, in the modern PC 110, a millisecond is an enormous amount of time as high speed system memory such as RAM 132 may have speed measured in nanoseconds, for example (one million times smaller). A 1 GHz processor may (theoretically) execute over one million instructions in a millisecond. Even small reductions in seek times can result in improvements in overall system performance, because the rest of the system is often waiting for the hard disk 140.

The hard disk 140 platters are spinning around at high speed, and the spin speed may not be synchronized to the process that moves the read/write heads to the correct cylinder on a random access on the hard disk 140. Therefore, at the time that the heads arrive at the correct cylinder, the actual sector that is needed may be anywhere. After the actuator assembly has completed its seek to the correct track, the drive 140 may wait for the correct sector to come around to where the read/write heads are located. This time is called latency. Latency is directly related to the spindle speed of the drive and such is influenced solely by the drive's spindle characteristics. Accordingly, any actions that can reduce access time may have a large impact on system performance.

The amount of available RAM 132 may also have an effect on the size of data that is capable of being stored in high speed memory. For example, if a system only has 8 k of high speed RAM 132, more frequent write operations will have to occur than if the system had 512 kb of high speed RAM 132 simply because the RAM 132 cannot store much data.

At block 200, the method may receive data to be stored on a lower speed data storage device. For example, a word processing file may be designated to be stored on a hard drive 140. At block 205, the data may be stored in a high speed memory. For example, the word processing file may be stored in a cache in RAM 132. At block 210, the method may collect additional data in the high speed memory 132 until a preferred amount of data is stored that is destined for a particular lower speed data device such as the hard drive 140. At block 215, the method may store the data in high speed memory 132 until it is of a size that is appropriate write size for a particular storage device. As described previously, the preferred amount of data may vary by device. For example, the preferred write size may be a multiple of 2 raised to a power such as is one of 128 kb, 256 kb, and 512 kb. In the flash memory example, the size may be the size of a flash memory block such that erase/write operations will be minimize by only writing to the flash device when an entire flash block is ready to be stored (rather than multiple erase/write operations). At block 220, once an appropriate write size of data for the particular device is stored in the high speed memory device 132, the data may be written to the lower speed device 140.

At block 225, the method may keep the data in high speed storage 132 until a determination is made that the data no longer is needed in high speed storage 132. For example, if a system has excess RAM 132, it may not tax the system to keep data that has already been written to low speed memory 140 also in high speed memory 132. As the data has already been stored in low speed memory 140, it may not be needed in high speed memory 132, but it may be kept there anyway as a convenience to the user.

At block 230, the data to be written to the low speed storage device 140 is backed up on an additional low speed storage device 140. In some instances, a user or a program may instruct that data be stored on a low speed storage device 140. The method may wait for an optimal amount of data before writing to the low speed memory. In the mean time, the low speed memory such as a flash memory unit 152 may be removed from the system. In these cases, it may be beneficial to have a back-up of the data in an additional low speed storage device. The data may be moved from the high speed memory 132 to an additional memory that is lower speed than the high speed memory 132 but higher speed than the low speed memory. At block 235, the method may warn a user that the data has yet to be written to the low speed memory device such as the flash 152 when a low speed memory device has been removed from the system before the data has been written from the high speed memory 132 to the low speed memory device 152. At block 240, the user may be presented the option to write the data from the high speed memory 132 to the low speed memory 152 before the low speed memory device is removed. At block 245, the method may wait until a period of low system activity to write to the low speed storage device.

As an example, the user or method may indicate that a word processing file is to be stored on a flash memory 152. The method may wait for enough data to match the optimal write size for flash memory 152 so the data may not be written to the flash memory 152 immediately if the size of the word processing file is less than the size of the optimal write size. If the flash is removed 152, the user may be warned that the data has yet to be written to the flash memory 152. In addition, the data may be already backed up in a "medium" speed storage device and this backup may be used to keep the data from being overwritten while in the high speed storage device 132.

At block 250, the method may organize the data in the high speed memory 132 such that the write to the low speed memory 140 is more efficient. The organization can be as simple as rearranging the data in the high speed memory 132 to be contiguous such that a transfer to the low speed memory 140 may proceed more efficiently.

At block 255, the method may analyze the data in the high speed memory 132 to determine if any of the data has been replaced with newer data before the data is written to the low speed memory 140. At block 260, the method may analyze the data in the high speed memory 132 to determine whether any of the data to be written to the low speed memory 140 is duplicate data wherein the older duplicate data is not written to the low speed memory 140 device. At block 265, the method may invalidate blocks in the high speed memory 132 when write operations impact those blocks before they have been committed to the low speed device 140.

At block 270, the method may keep an index of data in high speed memory 132 that is to be written to low speed memory 140 and if the data to be written to the low speed device 140 is resident in the high speed memory 132, the method may serve read requests for the data from the high speed memory 132 without regard as to whether the data has been written to low speed memory 140.

At block 275, the method may test the low speed memory 140 to determine the preferred write size for the low speed memory 140. For example, the method may inquire of a flash memory 152 what is the ideal erase/write size. At block 280, the method may also use indication from the low speed storage device 140 to calculate the preferred write size. For example, in the flash memory 152 example, the method may determine that blocks are erased in 1024 byte increments so the method may determine that save operations should occur in 1024 byte increments. The preferred write size may be related to the preferred erase size of the low speed memory 152.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer system comprising:
   a higher-speed memory device configured for operating at a higher speed than a lower-speed memory device;
   an additional memory device that is configured for operating at a lower-speed than the higher-speed memory device;
   the lower-speed memory device configured as removable storage media;
   the computer system configured for:
      receiving data designated to be stored on the lower-speed memory device;
      testing the lower-speed memory device to determine a preferred write size of the lower-speed memory device;
      storing on the higher-speed memory device an amount of the received data that matches the preferred write size of the lower-speed memory device;
      backing-up the amount of the stored data to the additional memory device;
      writing the amount of the stored data to the lower-speed memory device in response to the storing and to a period of low activity of the computer system.

2. The computer system of claim 1, wherein the lower-speed memory device comprises flash memory.

3. The computer system of claim 2, wherein the preferred write size is a preferred erase block size of the flash memory.

4. The computer system of claim 1 further configured for warning that the stored data has not yet been written to the lower-speed memory device in response to the lower-speed memory device being removed from the computer system prior to the stored data being written to the lower-speed memory device.

5. The computer system of claim 1 further configured for presenting an option to write the stored data to the lower-speed memory device.

6. The computer system of claim 1, the writing excluding older duplicate data of duplicate data of the amount of the stored data, where the older duplicate data is older than other duplicates of the duplicate data.

7. The computer system of claim 1 further configured for invalidating, prior to the writing, the amount of the stored data on the higher-speed memory device in response to a previous writing impacting the amount of the stored data.

8. A method comprising:
receiving, by a computing device, data designated to be stored on a lower-speed memory device configured as removable storage media, where the computing device comprises the lower-speed memory device, a higher-speed memory device configured for operating at a higher speed than the lower-speed memory device, and an additional memory device that is configured for operating at a lower-speed than the higher-speed memory device;
testing, by the computing device, the lower-speed memory device to determine a preferred write size of the lower-speed memory device;
storing, by the computing device on the higher-speed memory device, an amount of the received data that matches the preferred write size of the lower-speed memory device;
backing-up, by the computing device, the amount of the stored data to the additional memory device; and
writing, by the computing device, the amount of the stored data to the lower-speed memory device in response to the storing and to a period of low activity of the computer system.

9. The method of claim 8, the writing excluding older duplicate data of duplicate data of the amount of the stored data, where the older duplicate data is older than other duplicates of the duplicate data.

10. The method of claim 8 further comprising invalidating, prior to the writing, the amount of the stored data on the higher-speed memory device in response to a previous writing impacting the amount of the stored data.

11. The method of claim 8, wherein the lower-speed memory device comprises flash memory.

12. The method of claim 8, wherein the preferred write size is a preferred erase block size of the flash memory.

13. The method of claim 8 further comprising presenting an option to write the stored data to the lower-speed memory device.

14. The method of claim 8 further comprising warning that the stored data has not yet been written to the lower-speed memory device in response to the lower-speed memory device being removed from the computer system prior to the stored data being written to the lower-speed memory device.

15. At least one computer storage device storing computer-executable instructions that, when executed by a computing device, cause the computing device to perform a method comprising:
receiving data designated to be stored on a lower-speed memory device configured as removable storage media, where the computing device comprises the lower-speed memory device, a higher-speed memory device configured for operating at a higher speed than the lower-speed memory device, and an additional memory device that is configured for operating at a lower-speed than the higher-speed memory device;
testing the lower-speed memory device to determine a preferred write size of the lower-speed memory device;
storing, on the higher-speed memory device, an amount of the received data that matches the preferred write size of the lower-speed memory device;
backing-up the amount of the stored data to the additional memory device; and
writing the amount of the stored data to the lower-speed memory device in response to the storing and to a period of low activity of the computer system.

16. The method of claim 15, the writing excluding older duplicate data of duplicate data of the stored amount of the received data, where the older duplicate data is older than other duplicates of the duplicate data.

17. The method of claim 15 further comprising invalidating, prior to the writing, the amount of the stored data on the higher-speed memory device in response to a previous writing impacting the amount of the stored data.

18. The method of claim 15, wherein the lower-speed memory device comprises flash memory.

19. The method of claim 15, wherein the preferred write size is a preferred erase block size of the flash memory.

20. The method of claim 15 further comprising warning that the stored data has not yet been written to the lower-speed memory device in response to the lower-speed memory device being removed from the computer system prior to the stored data being written to the lower-speed memory device.

* * * * *